United States Patent [19]

Sedley

[11] 4,128,851
[45] Dec. 5, 1978

[54] HAND HELD MAGNETIC CARD ENCODER

[76] Inventor: Bruce S. Sedley, R.R. 1, Box 96, Koloa, Hi. 96756

[21] Appl. No.: 792,396

[22] Filed: Apr. 29, 1977

[51] Int. Cl.² ............................ G11B 5/00; G11B 5/12
[52] U.S. Cl. ............................................ 360/4; 360/2; 335/293; 360/117
[58] Field of Search .................... 360/2, 4, 117, 123; 335/293

[56] References Cited

U.S. PATENT DOCUMENTS

| 3,678,218 | 7/1972 | Kamenir | 360/117 |
| 3,924,115 | 12/1975 | Hampton et al. | 335/293 |
| 4,019,206 | 4/1977 | Haas | 360/123 |

FOREIGN PATENT DOCUMENTS

| 2258235 | 6/1973 | Fed. Rep. of Germany | 360/117 |
| 2317636 | 10/1974 | Fed. Rep. of Germany | 360/117 |

*Primary Examiner*—Jay P. Lucas
*Attorney, Agent, or Firm*—Gordon Wood

[57] ABSTRACT

A manually manipulatable magnetic card encoder containing substantially all of the apparatus and wiring required to encode magnetic spots on a magnetic card key or the like. The encoder is relatively small and includes a housing provided with a pistol grip to facilitate manual manipulation of the encoder.

2 Claims, 4 Drawing Figures

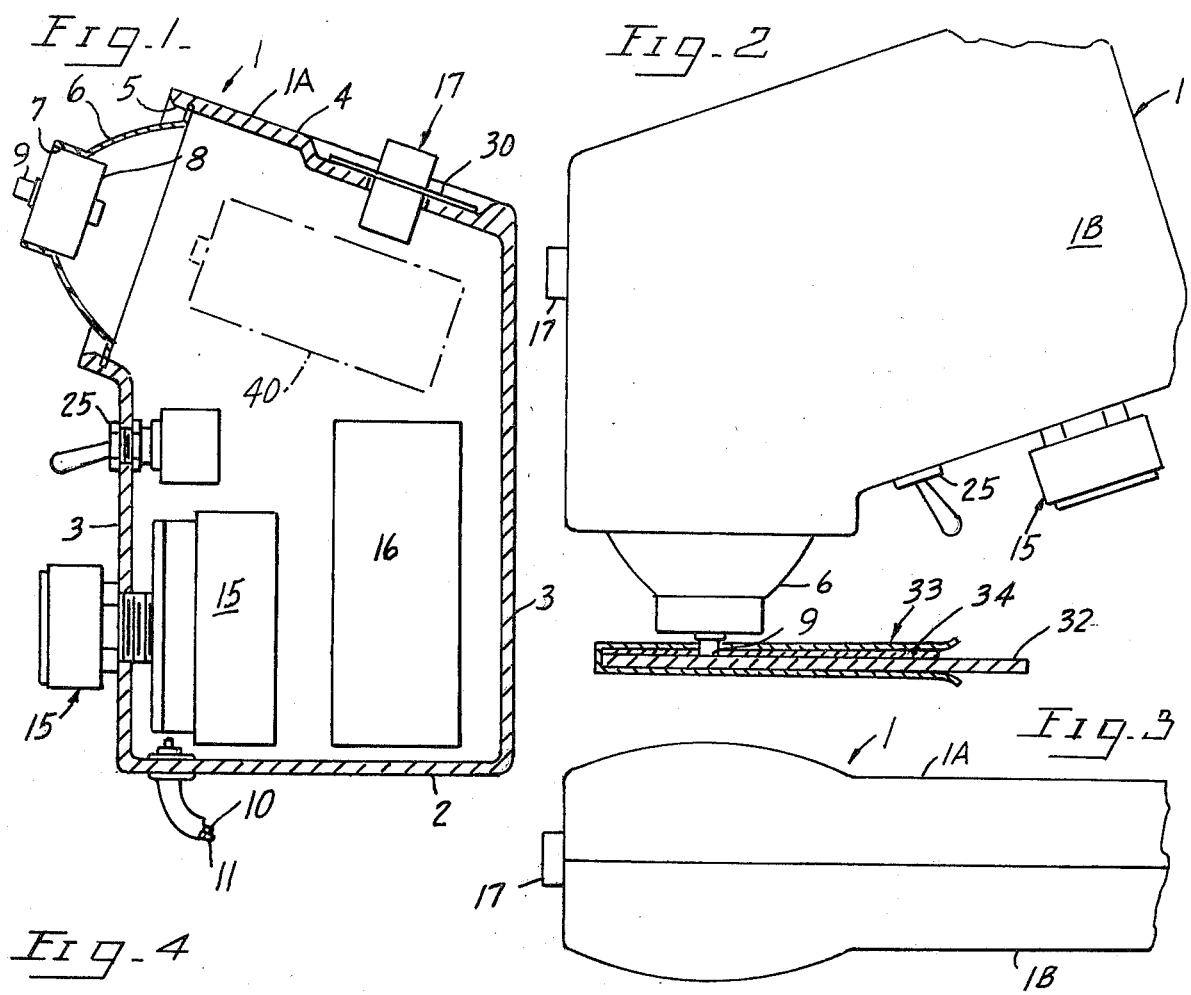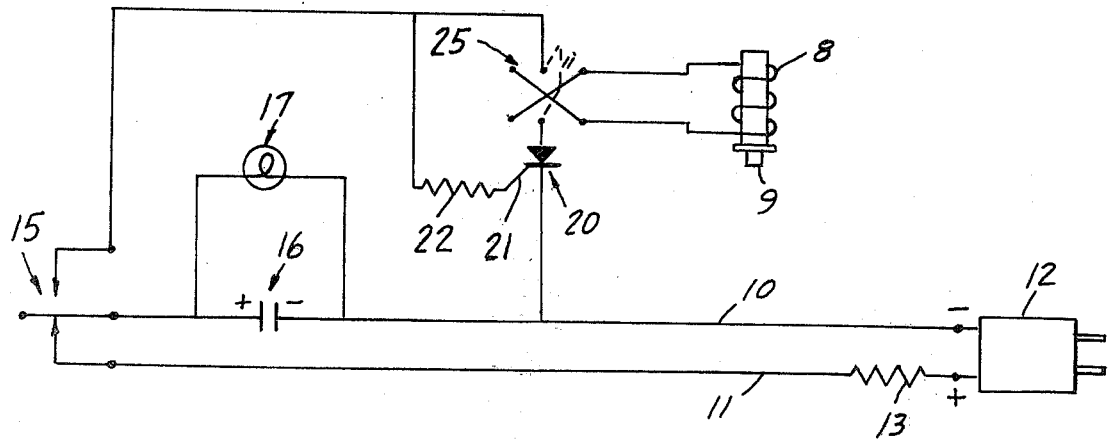

HAND HELD MAGNETIC CARD ENCODER

This invention relates to a portable and manually manipulatable encoder for encoding magnetic data in the form of "spots" or patterns on the surface of cards or card keys. A card key of the type which lends itself to use with the present invention is seen in my copending application Ser. No. 750,663, filed Dec. 13, 1976.

In the past most conventional card keys have been uniformly encoded with their magnetic patterns at the factory. In other words, the end user has never been provided with any equipment which would permit him to apply the desired code of magnetic spots to the surface of cards or card keys to be employed by such user. For these reasons considerable delay is encountered if the card or card key user desires to change the combination of a card key or to encode a blank card key or the like.

The main object of the present invention is therefore to provide a relatively simple hand held encoder which can be manually manipulated by the user to apply magnetic spots as required to magnetic cards and card keys.

Another object of the invention is the provision of a relatively small encoder which is light enough to be readily manipulated by the user and at the same time containing all of the apparatus and wiring required to create a relatively strong flux required to encode.

Other objects and advantages of the invention will be apparent from the following specification and from the drawings.

FIG. 1 is a side elevation of the preferred form of the encoder with the front half of the housing removed to show internal structure.

FIG. 2 is a side elevation of the encoder in use to apply a magnetic spot to a card key.

FIG. 3 is a top plan view of the encoder of FIG. 2.

FIG. 4 is a schematic wiring diagram of the circuitry.

The encoder comprises a molded housing, preferably of plastic, which is centrally split before final assembly to provide one half, indicated at 1A in FIG. 1, and the opposite similar half indicated at 1B in FIGS. 2 and 3. The housing includes a bottom wall 2 and side walls 3 which combine to form a pistol grip wherein the complete thickness of the housing is less than one-half the width of the housing as is shown in FIG. 3. The sidewalls 3 and top 4 of the housing terminate in an enlarged opening 5 in which is received a support 6 which is recessed within the opening 5 for fixedly securing said support to the housing.

Fixedly secured within a central aperture 7 in support 6 is a coil 8 which may consist of about 150 turns of No. 24 magnet wire and which coil is adapted to create magnetic lines of force for applying a strong flux to a centrally positioned probe 9 which is adapted to be applied by the user to the card to be encoded as seen in FIG. 2. Only the major elements of the circuitry are shown in FIG. 1 since the entire circuitry is shown schematically in FIG. 4. First referring to FIG. 4 the encoder is connected by means of lines 10, 11 to a power supply 12 which includes a charging resistance 13.

A trigger switch generally designated 15 is employed to charge and discharge a capacitor 16. In parallel with capacitor 16 is a lamp 17 which indicates the condition of capacitor 16.

When the trigger switch 15 is moved to its up position, as seen in FIG. 4, capacitor 16 discharges through coil 8 to create the desired magnetic field in probe 9. To obtain uniformity in the strength of the magnetic field it is preferable to discharge the capacitor 16 through a silicon controlled rectifier 20 in which the gate 21 is connected to the circuit through a resistance 22 to provide the desired voltage drop. Also in the circuit of coil 8 is a polarity switch 25 by which the user may reverse the polarity of the flux impressed on the card to be encoded.

Referring again to FIG. 1 it is seen that the trigger switch 15 is in the form of a push button which is convenient to the forefingers of the user when the desired pulse is to be generated in the probe.

The polarity switch 25 is also in close proximity to the forefingers of the user so that it is a simple matter to switch from one polarity to another as the coding of the card requires.

Although the size of the capacitor required in a circuit of the subject type is fairly large, such capacitor is readily received in the space available in the housing 1. The lamp 17 may be supported on a support 30 which in turn is secured to the top wall 4 of the housing 1 so that the operator may readily see the condition of the lamp 17.

Not only does the lamp provide a means for determining that the capacitor 16 is charged but it also indicates when the unit is connected to power and when it is disconnected. Furthermore, the lamp 17 bleeds off the charged capacitor through the filament so that the encoder is not stored with a charged capacitor. If desired, an on/off switch (not shown) may be incorporated in the circuit.

In use and referring to FIG. 2 it will be seen that the encoder 1 may be employed with a template 33 which is adapted to hold a card 32 in the desired position while the probe 9 is applied against said card to impress the magnetic spots thereon. Said template 33 may be provided with a nonmagnetic guide plate 34 which is formed with apertures arranged in a predetermined pattern to receive the probe 9 therethrough, thus insuring that the magnetic spots are applied at the correct points. The template 33 is not shown in detail since it forms no part of the instant invention except in combination with the disclosed invention as claimed in the following claims.

The present invention also contemplates the use of a dry cell battery as the source of direct current. Said battery may be substituted for the power supply 12 and lines 10, 11. As seen in FIG. 1 such battery may be positioned in the upper portion of housing 1 as indicated at 40 by dot-dash lines.

I claim:

1. A hand held encoder for encoding magnetic card keys and the like comprising:
   housing adapted to be manually held and manipulated,
   a probe mounted on said housing and having an outer tip adapted to be applied against a surface to be magnetized,
   an electrical circuit in said housing and including:
   a supply of direct current,
   windings around said probe, and
   a capacitor,
   a switch on said housing for discharging said capacitor through said windings to provide a magnetic field for magnetizing a spot at said surface when said tip is applied thereto,
   said housing being formed with a portion thereof providing a pistol grip, said switch being secured to said grip and adapted to be actuated by a finger of the user.

2. A hand held encoder for encoding magnetic card keys and the like comprising:
- a housing adapted to be manually held and manipulated,
- a probe mounted on said housing and having an outer tip adapted to be applied against a surface to be magnetized,
- an electrical circuit in said housing and including:
  - a supply of direct current,
  - windings around said probe, and
  - a capacitor,
- a switch on said housing for discharging said capacitor through said windings to provide a magnetic field for magnetizing a spot at said surface when said tip is applied thereto,
- a template for holding the card to be encoded, said template including openings defining points at which magnetic spots are to be applied, said outer tip of said probe being adapted to pass through said openings for engagement with said card to create points of magnetic flux whereby said card may be selectively magnetized in accordance with said template openings.

* * * * *